(12) United States Patent
Bulur et al.

(10) Patent No.: US 9,583,792 B2
(45) Date of Patent: Feb. 28, 2017

(54) DYNAMICALLY CONFIGURABLE AUTO-HEALING BATTERY

(71) Applicant: Lenovo Enterprise Solutions (Singapore) Pte. Ltd., Singapore (SG)

(72) Inventors: Yakup Bulur, Rochester, MN (US); Richard J. Fishbune, Rochester, MN (US); Mark E. Maresh, Cave Creek, AZ (US); Adam M. Wheeler, Rochester, MN (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 248 days.

(21) Appl. No.: 14/301,590

(22) Filed: Jun. 11, 2014

(65) Prior Publication Data

US 2015/0364940 A1    Dec. 17, 2015

(51) Int. Cl.
*H02J 7/00* (2006.01)
*H01M 10/42* (2006.01)

(52) U.S. Cl.
CPC ............................ *H01M 10/4207* (2013.01)

(58) Field of Classification Search
USPC .................. 320/116, 117, 118, 136
See application file for complete search history.

(56) References Cited

U.S. PATENT DOCUMENTS

| 3,663,931 A | 5/1972 | Brown |
| 4,149,764 A | 4/1979 | Mattingly, Jr. |
| 4,552,422 A | 11/1985 | Bennett et al. |
| 4,867,691 A | 9/1989 | Eck |
| 5,367,431 A | 11/1994 | Kunishi et al. |
| 5,411,400 A | 5/1995 | Subrahmanyan et al. |
| 5,460,531 A | 10/1995 | Vivio |

(Continued)

FOREIGN PATENT DOCUMENTS

| CA | 2603912 A1 | 10/2006 |
| DE | 19624887 | 1/1997 |

(Continued)

OTHER PUBLICATIONS

Goelectricdrive.com, A123 Video Presenting Prismatic Battery Pack, Jun. 14, 2011, 4 pages.

(Continued)

*Primary Examiner* — Brian Ngo
(74) *Attorney, Agent, or Firm* — Lieberman & Brandsdorfer, LLC

(57) ABSTRACT

A method, apparatus, and computer program product for a dynamically configurable auto-healing battery are provided in the illustrative embodiments. Identification of a condition is performed within the battery. The battery comprises a set of cells a subset of which is electrically connected in a configuration such that the configuration delivers a first amount of electrical power from the battery. The battery further comprising a second set of spare cells. Responsive to the condition, a cell is selected from the subset. Responsive to the condition, a spare cell is selected from the set of spare cells. The selected cell in the subset is made electrically unavailable in the configuration. The selected spare cell is made electrically available in the configuration, resulting in eliminating an effect of the condition on a power output of the battery.

17 Claims, 6 Drawing Sheets

(56) References Cited

U.S. PATENT DOCUMENTS

| | | |
|---|---|---|
| 5,825,630 A | 10/1998 | Taylor et al. |
| 5,940,263 A | 8/1999 | Jakoubovitch |
| 6,014,013 A | 1/2000 | Suppanz et al. |
| 6,027,828 A | 2/2000 | Hahn |
| 6,146,778 A | 11/2000 | Rouillard et al. |
| 6,268,711 B1 | 7/2001 | Bearfield |
| 6,773,848 B1 | 8/2004 | Nortoft et al. |
| 7,108,940 B2 | 9/2006 | Sharrow et al. |
| 7,198,866 B2 | 4/2007 | Miyamoto et al. |
| 7,816,055 B2 | 10/2010 | Jacobson et al. |
| 7,960,054 B2 | 6/2011 | Zhang et al. |
| 8,207,740 B2 | 6/2012 | Lin et al. |
| 2002/0175655 A1 | 11/2002 | Huykman et al. |
| 2003/0036311 A1 | 2/2003 | Benson et al. |
| 2006/0108081 A1 | 5/2006 | Onic et al. |
| 2006/0267546 A1 | 11/2006 | Shen et al. |
| 2007/0105409 A1 | 5/2007 | Brekosky et al. |
| 2008/0166926 A1 | 7/2008 | Seymour et al. |
| 2008/0207015 A1 | 8/2008 | Sueyoshi |
| 2009/0284076 A1 | 11/2009 | Lin et al. |
| 2010/0013430 A1 | 1/2010 | Manor et al. |
| 2010/0029103 A1 | 2/2010 | Costello |
| 2010/0134305 A1 | 6/2010 | Lu et al. |
| 2011/0117417 A1 | 5/2011 | Pitts |
| 2011/0140650 A1 | 6/2011 | Zhang et al. |
| 2011/0140662 A1* | 6/2011 | Li .................. H02J 7/0016 320/116 |
| 2012/0038315 A1 | 2/2012 | Wong |
| 2012/0242144 A1 | 9/2012 | Chorian et al. |
| 2012/0244390 A1 | 9/2012 | Cheng et al. |
| 2012/0249055 A1 | 10/2012 | Wade |
| 2012/0256592 A1 | 10/2012 | Baughman |
| 2012/0290234 A1 | 11/2012 | Schaefer |
| 2013/0020998 A1* | 1/2013 | Howard ............... H02J 7/0026 320/117 |
| 2013/0088201 A1* | 4/2013 | Iwasawa ............ G01R 31/3679 320/118 |
| 2013/0119935 A1 | 5/2013 | Sufrin-Disler et al. |
| 2013/0258830 A1 | 10/2013 | Yoda |
| 2013/0261815 A1 | 10/2013 | Suzuki |

FOREIGN PATENT DOCUMENTS

| | | |
|---|---|---|
| EP | 507977 | 10/1992 |
| EP | 000588615 | 3/1994 |
| EP | 932214 | 7/1999 |
| EP | 2375539 | 10/2011 |
| WO | 9526053 A1 | 9/1995 |
| WO | 2007134320 A3 | 11/2007 |
| WO | 2009128079 A1 | 10/2009 |

OTHER PUBLICATIONS

Bonfiglio et al., A Cost Optimized Battery Management System with Active Cell Balancing for Lithium Ion Battery Stacks, Infineon Technologies A6, 2009, pp. 304-309.

Ocean Server Technology, Inc., Large Battery System, 2004, 6 pages.

Ecamion Inc., Lithium Modular Battery Pack, 2009, 9 pages.

* cited by examiner

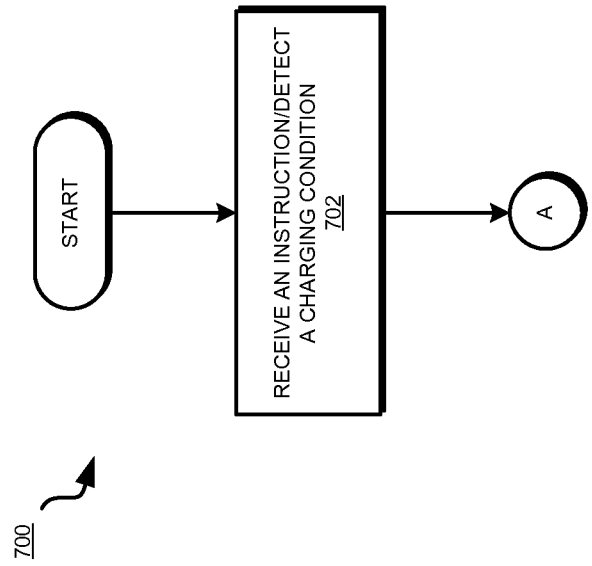
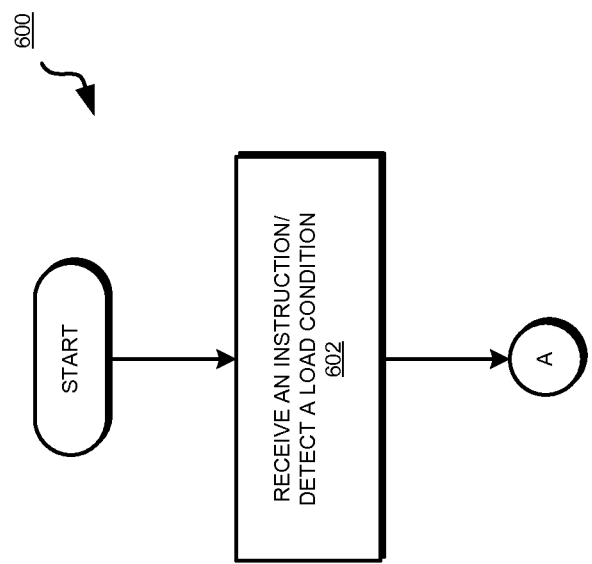

DYNAMICALLY CONFIGURABLE AUTO-HEALING BATTERY

TECHNICAL FIELD

The present invention relates generally to a method, system, and computer program product for configuring a battery. More particularly, the present invention relates to a method, system, and computer program product for a dynamically configurable auto-healing battery.

BACKGROUND

A battery is a commonly used source for supplying electrical power. A battery may store electrical power as electrical charge, or may produce electrical power through a chemical reaction. Some batteries are single-use, where upon use, the battery has to be replaced. Other batteries are reusable. The reusable batteries discharge when connected to a load circuit, and recharge when connected to a charging circuit.

A battery comprises one or more cells, each of which can hold an amount of the electrical charge or perform a portion of the chemical reaction. A cell in a battery produces a voltage, or potential difference, and supplies current to a load. A load is an electrical circuit including an electrical component with impedance.

More than one cell can be electrically connected to one another with a conductive material in a configuration to increase an output of the configuration. For example, when several cells are connected in series, the configuration produces a higher voltage than a single cell. As another example, when several cells are connected in parallel, the configuration produces a higher current than a single cell.

SUMMARY

The illustrative embodiments provide a method, system, and computer program product for a dynamically configurable auto-healing battery. An embodiment includes a method for dynamically configuring a battery. The embodiment identifies, within the battery, a condition, wherein the battery comprises a set of cells a subset of which is electrically connected in a configuration such that the configuration delivers a first amount of electrical power from the battery, the battery further comprising a second set of spare cells. The embodiment selects, responsive to the condition, a cell from the subset. The embodiment selects, responsive to the condition, a spare cell from the set of spare cells. The embodiment makes the selected cell in the subset electrically unavailable in the configuration. The embodiment makes the selected spare cell electrically available in the configuration, resulting in eliminating an effect of the condition on a power output of the battery.

Another embodiment includes a computer usable program product comprising a computer readable storage device including computer usable code for dynamically configuring a battery. The embodiment further includes computer usable code for identifying, within the battery, a condition, wherein the battery comprises a set of cells a subset of which is electrically connected in a configuration such that the configuration delivers a first amount of electrical power from the battery, the battery further comprising a second set of spare cells. The embodiment further includes computer usable code for selecting, responsive to the condition, a cell from the subset. The embodiment further includes computer usable code for selecting, responsive to the condition, a spare cell from the set of spare cells. The embodiment further includes computer usable code for making the selected cell in the subset electrically unavailable in the configuration. The embodiment further includes computer usable code for making the selected spare cell electrically available in the configuration, resulting in eliminating an effect of the condition on a power output of the battery.

Another embodiment includes a dynamically configurable battery. The embodiment further includes a set of cells, a subset of which is electrically connected in a configuration such that the configuration delivers a first amount of electrical power from the battery. The embodiment further includes a second set of spare cells. The embodiment further includes a monitoring component within the battery, which is configured to identify a condition, and select, responsive to the condition, a cell from the subset. The embodiment further includes a multiplexing component, which is configured to select, responsive to the condition, a spare cell from the set of spare cells, make the selected cell in the subset electrically unavailable in the configuration, and make the selected spare cell electrically available in the configuration, resulting in eliminating an effect of the condition on a power output of the battery.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 6 depicts a process for changing a configuration of cells in a dynamically configurable auto-healing battery in accordance with an illustrative embodiment; and FIG. 7 depicts a process for changing a configuration of cells in a dynamically configurable auto-healing battery in accordance with an illustrative embodiment.

DETAILED DESCRIPTION

Figure 1:
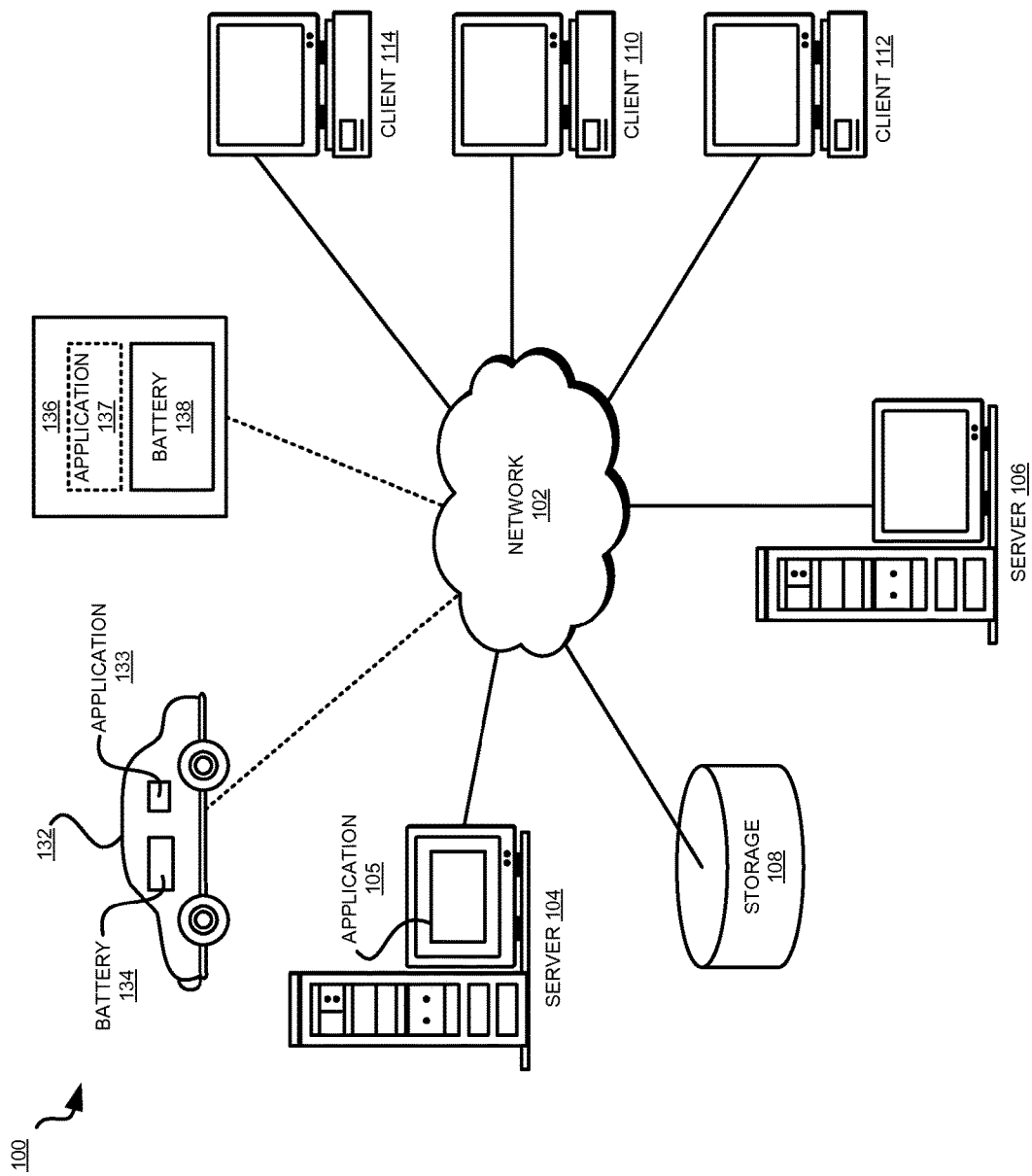
FIG. 1 depicts a block diagram of a network of data processing systems in which illustrative embodiments may be implemented.

Batteries are used in a variety of devices, appliances, and equipment. For example, batteries are used to power uninterruptible power supplies (UPS), a variety of computer equipment and computing devices, automobiles, satellites orbiting Earth and other celestial bodies, and even rovers and other equipment sent to distant planets and planetary bodies.

The illustrative embodiments recognize that many modern uses of batteries require much higher reliability of power supply from a battery than in the past. The illustrative embodiments further recognize that modern batteries are expected to service often unpredictable load swings without failing or degrading the battery performance.

For example, an electric vehicle presents a highly variable load on the battery in the vehicle. While the vehicle is stationary, the load on the vehicle's battery may be a fraction of the load presented when the vehicle is started or set in motion from rest. The load further varies, unpredictably when the vehicle tries to negotiate difficult uneven terrain.

Similarly, a battery in an orbiting satellite is exposed to large swings in temperatures, which adversely affects battery performance. Yet, the battery is expected to reliably supply power to the loads connected to the battery.

The illustrative embodiments further recognize that charging or recharging (collectively, "charging") conditions of a battery also vary greatly. For example, an electric vehicle may be plugged into a high-capacity or rapid charging outlet that is capable of supplying greater charging current than required to charge the battery at a given rate, e.g., an optimum rate. The same vehicle may be plugged into a different outlet, such as when travelling to a different location, where the current supply may be less than the charging current required to charge the battery at the optimum rate.

Furthermore, cells in a battery can fail, causing the battery's performance to suffer adversely. For example, a failed cell in a series configuration causes a drop in the battery's voltage output. A failed cell in a parallel configuration causes a drop in the battery's current output. Cell failures in a battery can occur due to manufacturing defects, abuse or misuse of the battery, operating the battery in hostile environments, corrosion, or from a variety of other causes or conditions.

The illustrative embodiments recognize that presently available batteries are not configured in a manner that they can recover to their original performance upon cell failures. Furthermore, the illustrative embodiments recognize that presently available batteries are designed or configured to handle load swings within a pre-determined set of thresholds, and loads outside those thresholds often deteriorate the battery's performance, utilization, or both.

The illustrative embodiments used to describe the invention generally address and solve the above-described problems and other problems related to batteries and battery design. The illustrative embodiments provide a method, system, and computer program product for a dynamically configurable auto-healing battery.

An embodiment configures within a battery at least two sections. A first section, called the matrix includes a first set of cells (matrix cells), and a second section, called the spare, includes a second set of cells (spare cells). Certain embodiments are described with respect to one matrix and one spare section only for the clarity of the description and not to imply a limitation on the illustrative embodiments. The battery can includes any number of matrix and spare sections within the scope of the illustrative embodiments.

The embodiment is further configured with at least one switching component (interchangeably referred to hereinafter as "switching component" or "multiplexer"). The embodiment is further configured with at least one controlling component (interchangeably referred to hereinafter as "monitor" or "controller").

The cells in the matrix and the spare sections are configured such that at least some of the matrix cells, some of the spare cells, or a combination thereof, can be electrically connected into a particular configuration in response to a corresponding switching signal. For example, in one example operation of an embodiment, the multiplexer sends a signal to the matrix such that nine out of an example twelve cells in the matrix are connected in parallel (or series). In another example operation of the embodiment, the multiplexer sends a signal to the matrix such that six out of the example twelve cells in the matrix are connected in series (or parallel). In another example operation of the embodiment, the multiplexer sends a signal to the matrix such that a first subset of six out of the example set of twelve cells in the matrix are connected in a first series (or first parallel), a second subset of the other six out of the example set of twelve cells in the matrix are connected in a second series (or second parallel), and the first and the second series (or parallel) are then connected in parallel (or series).

In another example operation of the embodiment, assume that a cell in the matrix section has failed or deteriorated. The multiplexer sends a signal to the matrix and the spare section such that the remaining eleven out of the example twelve cells in the matrix and one of the spare cells from the spare section are connected in series (or parallel).

In another example operation of the embodiment, assume that a load demands more current than the twelve example cells in the matrix section can provide. The multiplexer sends a signal to the matrix such that the twelve cells in the matrix and four spare cells from the spare section are connected in a parallel to supply the load with adequate current. An embodiment is configured to generate suitable signals from the multiplexer to substitute a matrix cell with a spare cell in a configuration, augment the matrix cells with spare cells in a configuration, reduce the number of used matrix cells in a configuration, or create other configurations with other combinations of matrix cells and spare cells in a similar manner.

Generally, an embodiment is configured to create a configuration of some or all matrix cells only, some or all spare cells only, or some or all matrix cells and spare cells, depending upon the electrical characteristics of a cell, a load condition, a charging condition, or a combination thereof.

A load condition is an electrical power demand of an electrical load or a change in the electrical load. For example, a current required for an operation of the load or a change in the electrical current demand of the load is an example of a load condition. A change in the current or voltage requirement to perform or change an operation of the electrical load is also an example of a load condition.

A charging condition is an availability of a quantity, type, or quality of electrical power to charge one or more cells in the battery. For example, availability of a higher than threshold charging current is an example charging condition. Availability of a lower than threshold charging current is another example charging condition. For example, when lower than a threshold amount of charging current is available, an embodiment selects only that number of cells and configures them in a configuration such that the charging current drawn by such configuration does not exceed the available charging current.

Other constraints on charging can also form a charging condition. For example, given a time charging constraint, an embodiment selects some cells for charging and not others according to a specified criterion. The time constraint and criterion or criteria for cell selection can be supplied to the battery via an instruction as described elsewhere in this disclosure. In one embodiment, the battery includes a pre-configured cell selection criterion for this and other charging conditions.

Furthermore, the monitor is electrically coupled with the matrix and the spare sections such that the monitor can determine an electrical property of each matrix cell, each spare cell, or all cells in the matrix and spare sections. An electrical property of a cell includes but is not limited to a maximum voltage output possible from the cell, maximum current output possible from the cell, or a combination thereof. A healthy cell is a cell that can provide at least a threshold voltage, at least a threshold current, or both. An example of a failed cell is a cell whose voltage output has fallen below a lower predetermined threshold voltage, whose current output has fallen below a lower predetermined threshold current, or both. An example of a deteriorated cell is a cell whose voltage output has fallen below an upper predetermined threshold voltage, whose current output has fallen below an upper predetermined threshold current, or both.

These examples of failed or deteriorated cells, and the example manners of identifying them are not intended to be limiting on the illustrative embodiments. A cell can be deemed failed or deteriorated for many other reasons and by many other methods, and the same are contemplated within the scope of the illustrative embodiments. For example, a rise in a cell's temperature (or a lack thereof) beyond a threshold, or a reduction in a capacity of a cell below a threshold are some other ways in which a cell can be identified as failed or deteriorated. Furthermore, the determination of the failing or deteriorating factors such as the voltage, the current, the temperature, the capacity and the like can be made during discharge or charging of the cell or by a dedicated status determination operation at other times.

The capacity of a cell can be interpreted in several ways, including but not limited to (i) an amount of charge held in the cell, (ii) peak amperes supplied, and duration for which the cell can supply that peak current, or (iii) total ampere-hours the cell can supply before draining below a threshold charge. From this disclosure, those of ordinary skill in the art will be able to conceive other ways of measuring a cell's capacity, and such ways are contemplated within the scope of the illustrative embodiments.

In one example operation of an embodiment, the monitor determines that a matrix cell has either failed or deteriorated. The monitor instructs the multiplexer to switch off or disconnect that matrix cell, or otherwise make that matrix cell electrically unavailable for participating in a configuration to supply power to a load, receive charging current, or both. The same instruction from the monitor, or a separate instruction from the monitor to the multiplexer further instructs the multiplexer to switch on, connect, or otherwise make a spare cell electrically available in place of that disconnected matrix cell for participating in a configuration to supply power to a load, receive charging current, or both.

In one embodiment, the monitor is further configured to determine, evaluate, detect, receive, predict, anticipate, or otherwise compute a load condition. For example, assume that in one instance, the monitor detects a rising trend in the load current. For example, tracking of demand on automotive battery during navigation can be route-dependent due to the change in the power consumption of the processor of the navigation device. An anticipated route condition can predict a rise in the processor's demand for power, and can alert the monitor about an impending load increase.

Accordingly, the monitor instructs the multiplexer to add to a configuration supplying the power, a number of matrix cells if available, spare cells if available, or a combination of matrix cells and spare cells if available, where the number is sufficient to supply an expected level of current demand during a given period.

In another example instance, the monitor detects that the load current has dropped below a lower threshold. Accordingly, the monitor instructs the multiplexer to remove from a configuration supplying the power, a number of matrix cells, a number of spare cells, or a combination of a number of matrix cells and spare cells, where the number of remaining cells in the configuration is sufficient to supply an expected level of current demand during a given period.

In another example instance, the monitor detects that the charging current is below a lower threshold. Accordingly, the monitor instructs the multiplexer to remove from a configuration receiving the charge or recharge, a number of matrix cells, a number of spare cells, or a combination of a number of matrix cells and spare cells, where the number of remaining cells in the configuration can be sufficiently charged with the available charging current. These example manners of operation of a dynamically configurable auto-healing battery, and other similarly purposed operations conceivable from this disclosure are some example ways in which a battery according to an embodiment can auto-heal. Auto-healing comprises a process of maintaining the power and performance within a one or more tolerance limits of fluctuations while facing a cell failure or degradation, load changes, charging changes, and other conditions that adversely affect the power and performance of the battery.

The illustrative embodiments are described with respect to certain power supply configurations, charging configurations, cells combinations, thresholds, cell health factors, electrical characteristics, load conditions, charging conditions, manner of detections, instructions, events, rules, policies, algorithms, data processing systems, environments, components, and applications only as examples. Any specific manifestations of such artifacts are not intended to be limiting to the invention. Any suitable manifestation of data processing systems, environments, components, and applications can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments.

Additional or different advantages may be realized by specific illustrative embodiments.

Furthermore, a particular illustrative embodiment may have some, all, or none of the advantages listed above.

Figure 2:
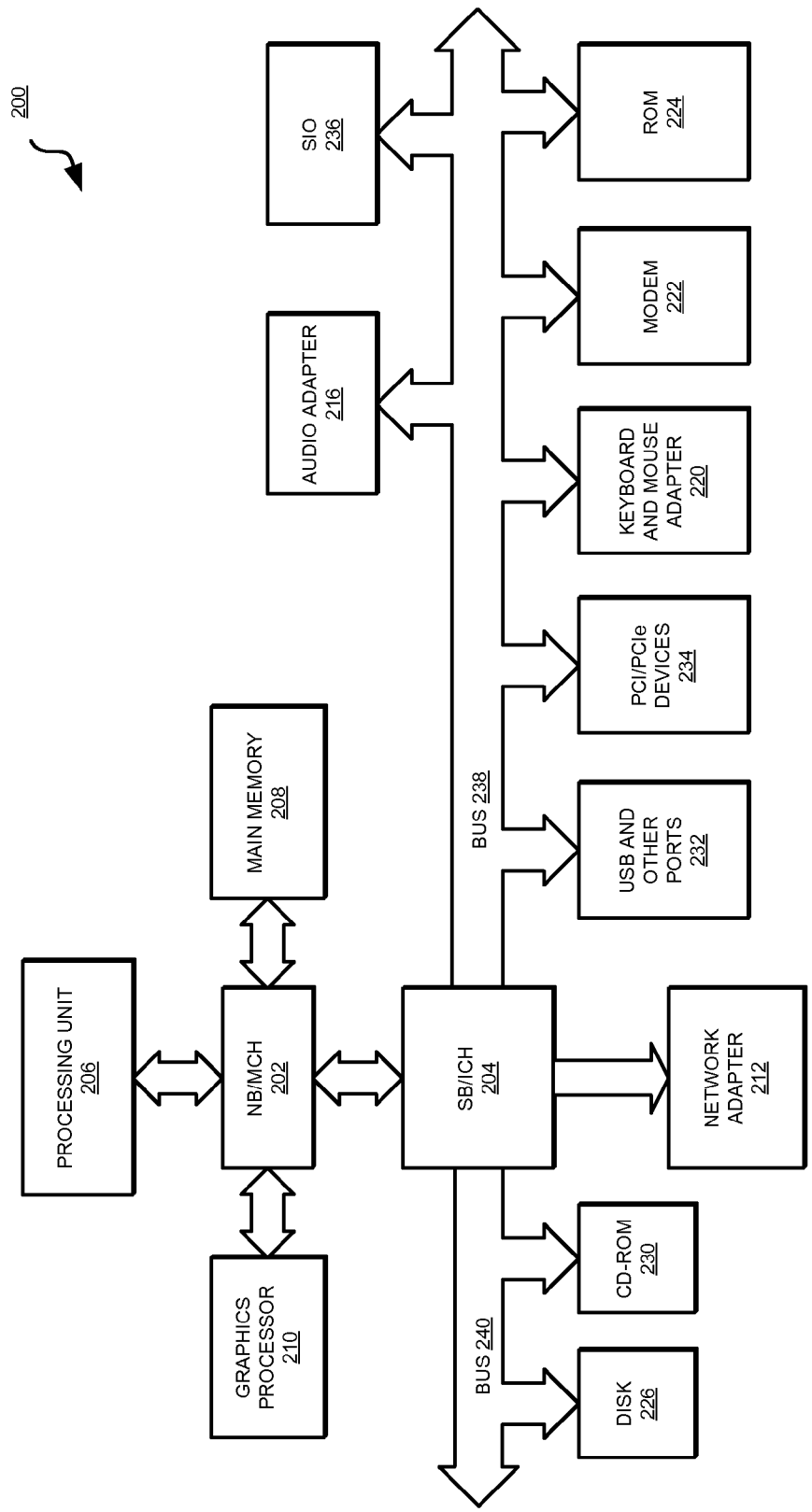
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are useable in an embodiment. For example, assume that an instance of a battery according to an embodiment, battery 134, is configured in vehicle 132. Device 136 can be any device configured to use a battery, and uses battery 138, which is another instance of a battery according to an embodiment. Generally, a battery according to an embodiment, such as batteries 134 and 138, includes sections of cells, a monitor, and a multiplexer as described elsewhere in this disclosure. Applications 105, 133, and 135 are examples of some possible ways of sending instructions to battery 134 or 138. For example, server 104 may be executing a navigation plan for vehicle 132 and determines that the vehicle is about to begin a climb, which will increase the load on battery 134. Accordingly, application 150 sends an instruction about the impending load increase to the monitor in battery 134. The monitor and the multiplexer components of battery 134 then configure or reconfigure the cells in the battery to support the anticipated increased load. As another example, application 133 in vehicle 132 can be an engine monitoring application that determines that the reliance on the battery is about to be reduced, and the power demand is about to be shifted to the gasoline part of the hybrid engine of vehicle 132. Accordingly, application 133 sends an instruction about the impending load decrease to the monitor in battery 134. The monitor and the multiplexer components of battery 134 then configure or reconfigure the cells in the battery to support the anticipated decreased load. As another example, device 136 may be a satellite or a rover. Application 137 in device 136 or application 105 in server 104 can be on-board or remote monitoring applications monitoring the operations of the satellite or the rover. Application 137 or 105 determines that the conditions of operation of the battery are about to become harsher, and the battery performance is about to degrade. Accordingly, application 137 or 105 sends an instruction about the impending battery performance decrease to the monitor in battery 138. The monitor and the multiplexer components of battery 138 then configure or reconfigure the cells in the battery to continue supporting the load with increased number of cells operating under degraded performance conditions.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114, or systems 132, 136, or 142 in FIG. 1, or another type of device in which computer usable program code or instructions implementing the processes may be located for the illustrative embodiments. Data processing system 200 is also representative of a device, such as an embedded system (not shown) in vehicle 132 in FIG. 1 on which application 133 executes, or device 136 in FIG. 1, in which computer usable program code or instructions implementing the processes of the illustrative embodiments may be located for the illustrative embodiments. Data processing system 200 is also representative of an embedded, removable, or mobile computing device, such as to run an example implementation of application 133 in FIG. 1, or device 136 in FIG. 1 in which computer usable program code or instructions implementing the processes of the illustrative embodiments may be located. Data processing system 200 is described as a computer only as an example, without being limited thereto. Implementations in the form of systems in vehicle 132 or device 136 in FIG. 1 may modify data processing system 200 and even eliminate certain depicted components there from without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as applications 105, 133, and 137 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
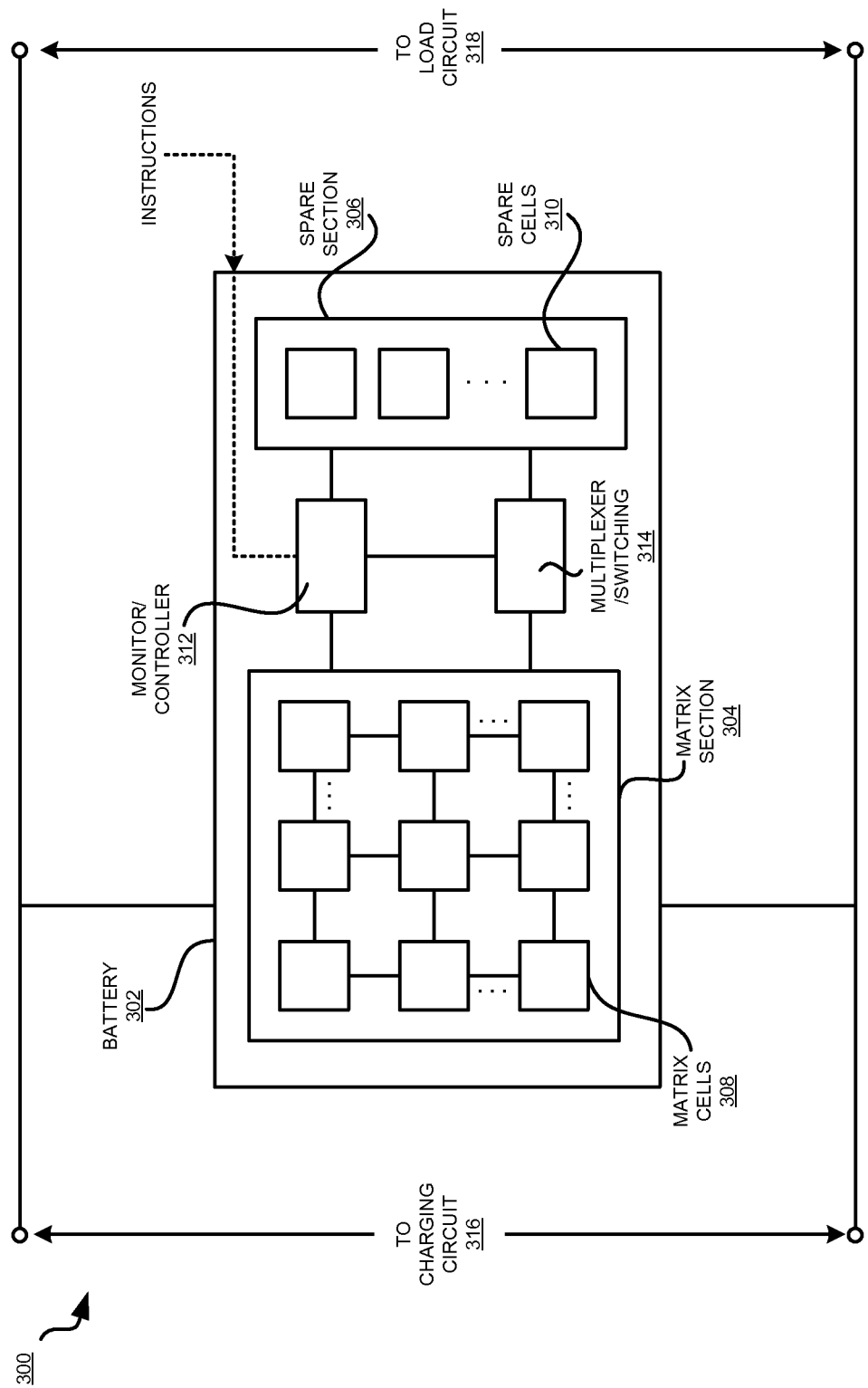
FIG. 3 depicts a block diagram of a configuration for using a dynamically configurable auto-healing battery in accordance with an illustrative embodiment.

With reference to FIG. 3, this figure depicts a block diagram of a configuration for using a dynamically configurable auto-healing battery in accordance with an illustrative embodiment. Configuration 300 may be implemented, for example, in vehicle 132 or device 136 in FIG. 1. Accordingly, battery 302 is an example of battery 134 or 138, respectively, in FIG. 1.

Battery 302 includes one or more matrix sections, such as matrix section 304, in the manner described elsewhere in this disclosure. Battery 302 includes one or more spare sections, such as spare section 306, in the manner described elsewhere in this disclosure.

Matrix section 304 includes any number of matrix cells 308. Any number of matrix cells 308 can be configured in matrix section 304 without limitation. In some instances, the number of matrix cells 308 can reach into the hundreds or thousands. Spare section 306 includes any number of matrix cells 310. Any number of spare cells 310 can be configured in spare section 306 without limitation.

Monitor 312 monitors cell health, load conditions, charging conditions, or performs a combination these and other functions. Monitor 312 further communicates with, instructs, or otherwise informs multiplexer 314 about conditions warranting cell configuration changes. Some non-limiting and non-exhaustive examples of such communications are described elsewhere in this disclosure.

Multiplexer 314 sends electrical signals as needed to electronic or electrical components, e.g., switches, that are associated with matrix cells 308, spare cells 310, or both. The electrical signals cause those electronic or electrical components to operate in a manner that the associated cells are connected or disconnected in the configuration. The resulting configuration then either receives charging power from charging circuit 316, or supplies power to load circuit 318, as the case may be.

Figure 4:
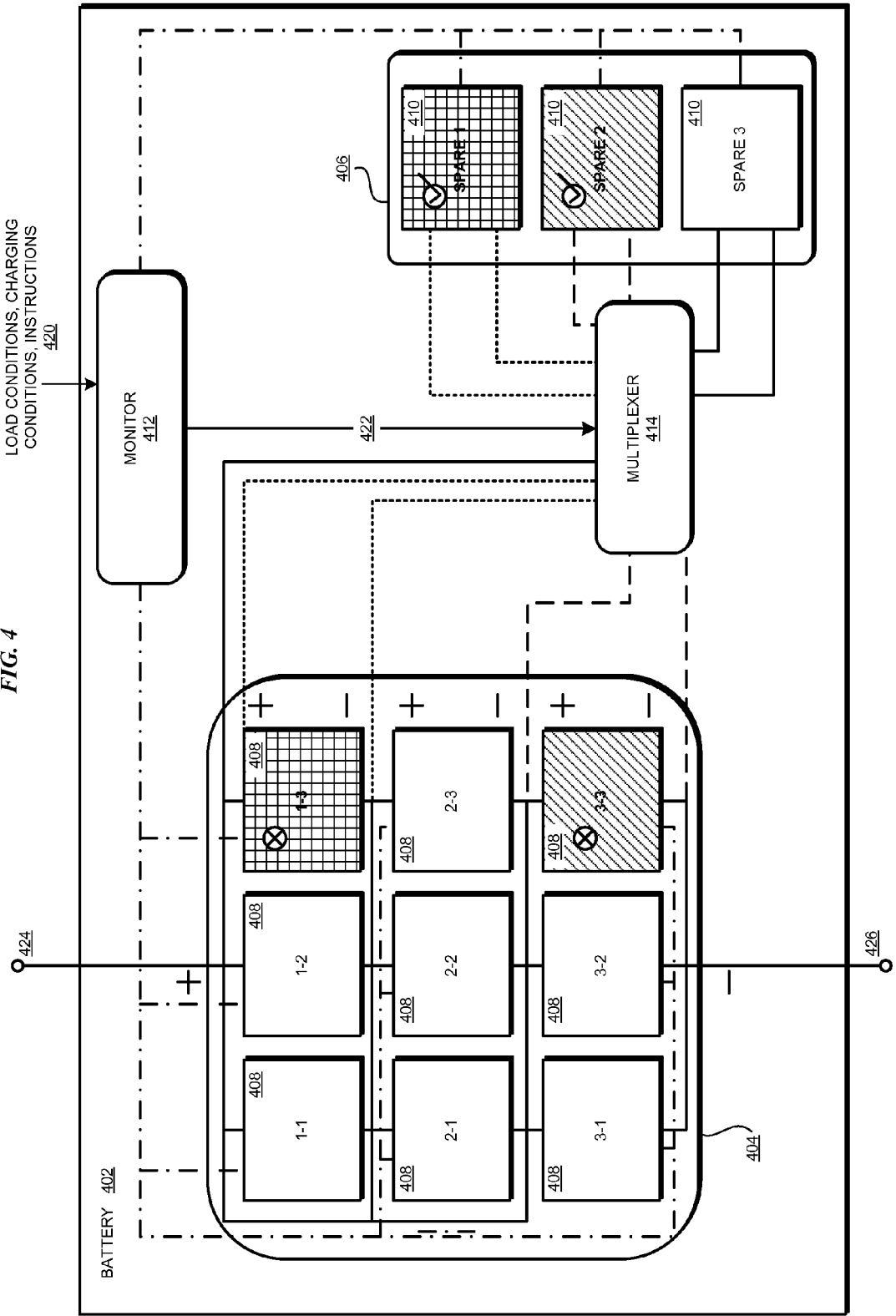
FIG. 4 depicts an example configuration in a dynamically configurable auto-healing battery in accordance with an illustrative embodiment.

With reference to FIG. 4, this figure depicts an example configuration in a dynamically configurable auto-healing battery in accordance with an illustrative embodiment. Battery 402 is an example of battery 302 in FIG. 3. Battery 402 includes matrix 404, spare section 406, matrix cells 408, spare cells 410, monitor 412, and multiplexer 414 in the manner of matrix 304, spare section 306, matrix cells 308, spare cells 310, monitor 312, and multiplexer 314, respectively, in FIG. 3.

Matrix 404 depicts an example configuration of nine example matrix cells 408 in some combination of series and parallel connections with one another. Matrix cell 408 labeled 1-1 occupies row 1 column 1 position in the example three-by-three arrangement. Other matrix cells 408 labeled 1-2 through 3-3 similarly occupy the row of the first number in the label and the column of the last number in the label in the example arrangement.

Monitor 412 is coupled with each matrix cell 408 and each spare cell 410 in any suitable manner to test a cell's health, voltage output, current output, power output, and other electrical characteristics. Multiplexer 414 is coupled with each matrix cell 408 and each spare cell 410 in any suitable manner to switch a cell in or out of a configuration. Monitor 412 is further configured to receive inputs 420, which include but are not limited to load conditions, charging conditions, and instructions from other applications such as application 105, 133, or 137 in FIG. 1. As an example, an input lead or data path allows input 420 to be communicated to monitor 412.

In an example operation, monitor 412 determines that matrix cells 1-3 and 3-3 are to be replaced in the given configuration. For example, cell 1-3 may have failed, and cell 3-3 may be operating in a deteriorated state. Over communication path 422, monitor 412 informs multiplexer 414 of the need to replace cells 1-3 and 3-3. Multiplexer 414 selects spare cell 410 labeled 1 to replace matrix cell 1-3 and spare cell 410 labeled 2 to replace matrix cell 3-3.

Multiplexer 414 switches the electrical or electronic components associated with matrix cells 1-3 and 3-3 and spare cells 1 and 2 such that matrix cells 1-3 and 3-3 no longer participate in the configuration and spare cells 1 and 2 take their respective places in the configuration. The revised configuration then either supplies a load or receives charging via battery leads 424 and 426.

Figure 5:
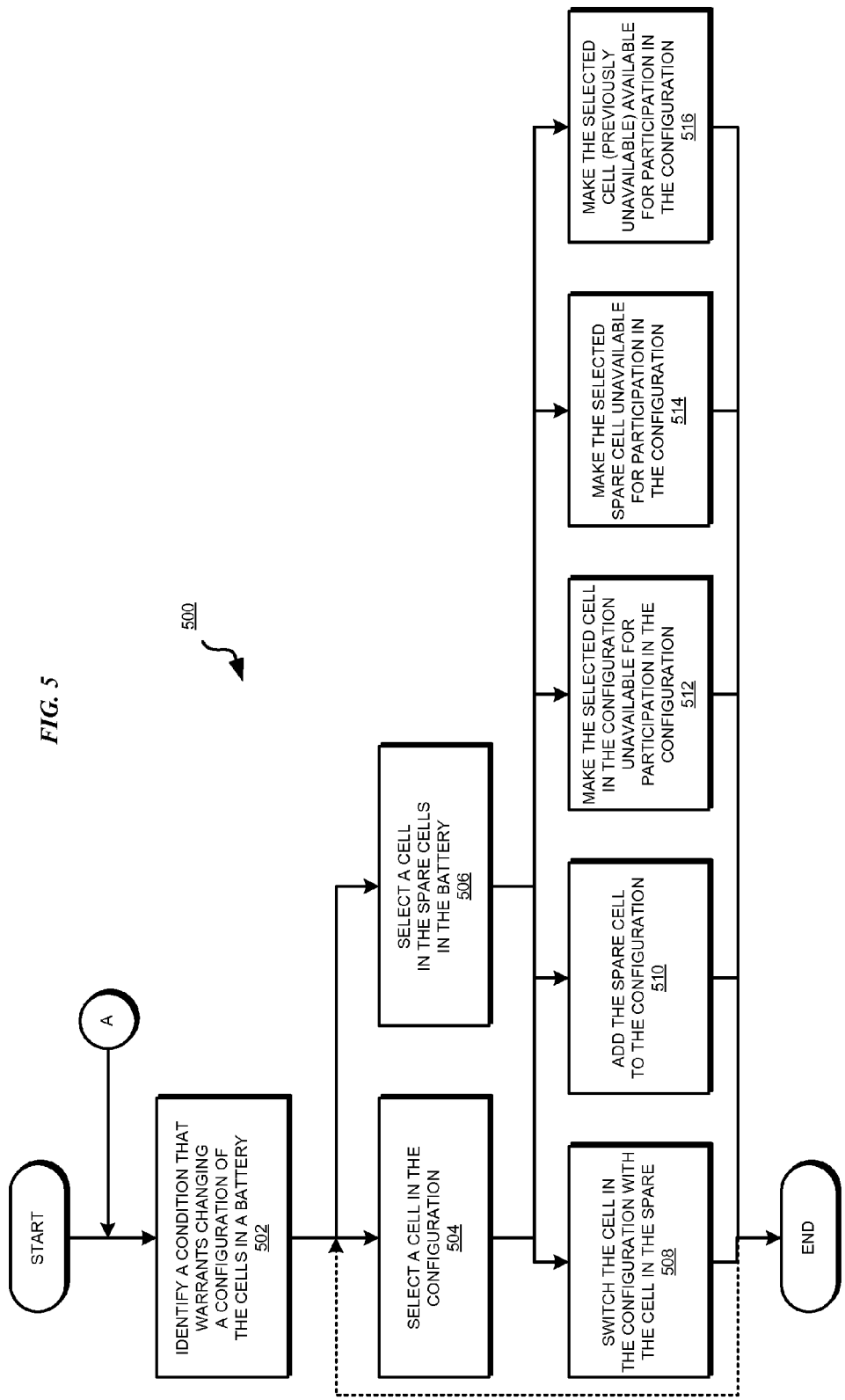
FIG. 5 depicts a flowchart of an example process for operating a dynamically configurable auto-healing battery in accordance with an illustrative embodiment.

With reference to FIG. 5, this figure depicts a flowchart of an example process for operating a dynamically configurable auto-healing battery in accordance with an illustrative embodiment. Process 500 can be implemented in a battery according to an embodiment, e.g., battery 402 in FIG. 4.

The battery or a component thereof, e.g., monitor 412 in FIG. 4, identifies a condition that warrants changing a configuration of the cells in the battery (block 502). The battery or a component thereof, e.g., multiplexer 414 in FIG. 4, performs one or both of blocks 504 and 506. The battery selects a cell in the configuration (block 504). Alternatively, or together with block 504, the battery selects a cell from the spare cells in the battery (block 506).

Depending on the circumstances under which the configuration has to be changed, the battery or a component thereof, e.g., multiplexer 414 in FIG. 4, may perform one or more of blocks 508, 510, 512, 514, and 516, in the alternative or in some combination using the selected cell in the configuration, the selected spare cell, or both. For example, in case the selected cell in the configuration has failed, is failing, or has deteriorated in performance, the battery switches the selected cell in the configuration with the selected spare cell (block 508). The battery may end process 500 thereafter.

As another example, in the circumstance where a greater power output is desired from the configuration, the battery adds the spare cell to the configuration (block 510). The battery may end process 500 thereafter.

As another example, in the circumstance where the total power output of the battery has to be reduced, or an inadequate amount of charging current is available to charge all cells in the configuration, the battery makes the selected cell in the configuration electrically unavailable for participation in the configuration (block 512). The battery may end process 500 thereafter.

In another example, in case the selected spare cell is already in use and is no longer needed, e.g., when the power demand has dropped or an inadequate amount of charging current is available, the battery makes the selected spare cell electrically unavailable for participation in the configuration (block 514). The battery may end process 500 thereafter.

In another example, in case the selected cell is previously excluded from the configuration, e.g., when a cell had deteriorated previously due to higher than threshold temperature, the battery makes the selected cell electrically available for participation in the configuration, e.g., when the deteriorated cell's temperature has dropped below the threshold, (block 516). The battery may end process 500 thereafter.

In another example circumstance when the power demand has dropped or an inadequate amount of charging current is available, the battery may perform blocks 512 and 514 together. In another example circumstance, when the power demand has increased and a cell in the configuration has failed, the battery may perform blocks 508 and 510 together.

The example circumstances and the manner of executing certain block-combinations of process 500 are not intended to be limiting on the illustrative embodiments. From this disclosure, those of ordinary skill in the art will be able to execute combinations of the depicted blocks and other similarly purposed blocks to address other circumstances not described in the examples here. Such other combinations and other similarly purposed blocks are contemplated within the scope of the illustrative embodiments.

With reference to FIG. 6, this figure depicts a process for changing a configuration of cells in a dynamically configurable auto-healing battery in accordance with an illustrative embodiment. Process 600 can be implemented in battery 402 in FIG. 4.

The battery or a component thereof, e.g., monitor 412 in FIG. 4, receives an instruction about, or otherwise detects, a load condition or a change in the load condition (block 602). Process 600 then exists at exit point marked "A" and enters another process, e.g., process 500 in FIG. 5 at a corresponding entry point marked "A" and continues the entered process there from. As an example, an application such as any of applications 105, 133, or 137 in FIG. 1 may send the instruction received in block 602. Furthermore, the instruction may take any suitable form, including but not limited to code, pseudo code, digital value, analog value or signal, or other variations or combinations thereof.

The battery may also detect the load condition by measuring a value of a current, a voltage, or a rate of change thereof at a battery terminal or lead. Using this disclosure, other direct and indirect ways of determining a load condition or a change in a load condition will be apparent to those of ordinary skill in the art and the same are contemplated within the scope of the illustrative embodiments.

With reference to FIG. 7, this figure depicts a process for changing a configuration of cells in a dynamically configurable auto-healing battery in accordance with an illustrative embodiment. Process 700 can be implemented in battery 402 in FIG. 4.

The battery or a component thereof, e.g., monitor 412 in FIG. 4, receives an instruction about, or otherwise detects, a charging condition or a change in the charging condition (block 702). Process 700 then exists at exit point marked "A" and enters another process, e.g., process 500 in FIG. 5 at a corresponding entry point marked "A" and continues the entered process there from. As an example, an application such as any of applications 105, 133, or 137 in FIG. 1 may send the instruction received in block 702. Furthermore, the instruction may take any suitable form, including but not limited to code, pseudo code, digital value, analog value or signal, or other variations or combinations thereof.

The battery may also detect the charging condition by measuring a value of a current, a voltage, or a rate of change thereof at a battery terminal or lead. Using this disclosure, other direct and indirect ways of determining a charging condition or a change in a charging condition will be apparent to those of ordinary skill in the art and the same are contemplated within the scope of the illustrative embodiments.

Thus, a computer implemented method, system or apparatus, and computer program product are provided in the illustrative embodiments for a dynamically configurable auto-healing battery. Although certain cells are described as belonging to the matrix section and the spare section, a cell need not be relegated to one section or another permanently. Within the scope of the illustrative embodiments, matrix cells can be moved or re-categorized as spare cells, and vice-versa, such as to ensure that each cell receives sufficient number of discharge and recharge cycles over a period.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for dynamically configuring a battery, the method comprising:
monitoring, within the battery, a condition, wherein the battery comprises a set of cells a subset of which is electrically connected in a configuration such that the configuration delivers a first amount of electrical power from the battery, the battery further comprising a second set of spare cells;
selecting, responsive to the condition, a cell from the subset;
selecting, responsive to the condition, a spare cell from the set of spare cells;
making the selected cell in the subset electrically unavailable in the configuration;
making the selected spare cell electrically available in the configuration, resulting in eliminating an effect of the condition on a power output of the battery;
identifying, within the battery, a second condition at a time after monitoring the condition, wherein the second condition is indicative of a change in a state of the selected cell in the subset;
selecting, responsive to the second condition the selected s are cell in the configuration;
making the selected spare cell in the configuration electrically unavailable in the configuration; and
making the selected cell in the subset electrically available in the configuration again at a second time after the time.

2. The method of claim 1, further comprising:
identifying, within the battery, a third condition, wherein the third condition comprises an increase in an electrical load on the battery;
selecting, responsive to the third condition, a second spare cell from the set of spare cells; and
making the selected second spare cell electrically available in the configuration, resulting in increasing the power output of the battery.

3. The method of claim 2, wherein the increase in an electrical load on the battery comprises an increase in a rate of change in the electrical load on the battery.

4. The method of claim 2, further comprising:
receiving, within the battery, an instruction, wherein the instruction includes an indication of the third condition, and wherein the third condition is expected to occur in the future.

5. The method of claim 1, further comprising:
identifying, within the battery, a third condition, wherein the third condition comprises a decrease in an electrical power available for charging the battery;
selecting, responsive to the third condition, a second cell from the set of cells; and
making the selected second cell electrically unavailable in the configuration, resulting in a reduction in a charging power requirement of the battery.

6. The method of claim 1, further comprising:
detecting a second state of the selected cell in the subset of cells, and wherein the second state is indicative of an amount of power supplied by the selected cell having reduced below a threshold.

7. The method of claim 1, further comprising:
detecting a second state of the selected cell in the subset of cells, and wherein the second state is indicative of a remaining capacity of the selected cell having reduced below a threshold.

8. The method of claim 1, further comprising:
configuring, within the battery, the cells in the subset such that each cell in the subset can be made electrically unavailable from the configuration while the configuration is delivering the first amount of electrical power; and
configuring, within the battery, each spare cell in the set of spare cells such that each cell in the set can be made electrically available in the configuration while the configuration is delivering the first amount of electrical power to one of (i) maintain a power output of the battery at the first amount, and (ii) increase the power output of the battery to a second amount.

9. The method of claim 1, further comprising:
performing the monitoring using a monitoring component located within the battery;
using a multiplexing component located within the battery for making the selected cell in the subset electrically unavailable in the configuration and for making the selected spare cell electrically available in the configuration, wherein the multiplexing component selects the selected cell from the subset and the selected spare cell upon receiving information from the monitoring component, wherein the information identifies the selected cell from the subset to the multiplexing component.

10. A computer usable program product comprising a computer readable storage device including computer usable code for dynamically configuring a battery, the computer usable code comprising:
computer usable code for monitoring, within the battery, a condition, wherein the battery comprises a set of cells a subset of which is electrically connected in a configuration such that the configuration delivers a first amount of electrical power from the battery, the battery further comprising a second set of spare cells;
computer usable code for selecting, responsive to the condition, a cell from the subset;
computer usable code for selecting, responsive to the condition, a spare cell from the set of sp re cells;
computer usable code for making the selected cell in the subset electrically unavailable in the configuration;

computer usable code for making the selected spare cell electrically available in the configuration, resulting in eliminating an effect of the condition on a power output of the battery;

computer usable code for identifying, within the battery, a second condition at a time after monitoring the condition, wherein the second condition is indicative of a change in a state of the selected cell in the subset;

computer usable code for selecting, responsive to the second condition, the selected spare cell in the configuration;

computer usable code for making the selected spare cell in the configuration electrically unavailable in the configuration; and computer usable code for making the selected cell in the subset electrically available in the configuration again at a second time after the time.

11. The computer usable program product of claim 10, further comprising:

computer usable code for identifying, within the battery, a third condition, wherein the third condition comprises an increase in an electrical load on the battery;

computer usable code for selecting, responsive to the third condition, a second spare cell from the set of spare cells; and computer usable code for making the selected second spare cell electrically available in the configuration, resulting in increasing the power output of the battery.

12. The computer usable program product of claim 11, wherein the increase in an electrical load on the battery comprises an increase in a rate of change in the electrical load on the battery.

13. The computer usable program product of claim 11, further comprising:

computer usable code for receiving, within the battery, an instruction, wherein the instruction includes an indication of the third condition, and wherein the third condition is expected to occur in the future.

14. The computer usable program product of claim 10, further comprising:

computer usable code for identifying, within the battery, a third condition, wherein the third condition comprises a decrease in an electrical power available for charging the battery;

computer usable code for selecting, responsive to the third condition, a second cell from the set of cells; and computer usable code for making the selected second cell electrically unavailable in the configuration, resulting in a reduction in a charging power requirement of the battery.

15. The computer usable program product of claim 10, further comprising:

computer usable code for detecting a second state of the selected cell in the subset of cells, and wherein the second state is indicative of an amount of power supplied by the selected cell having reduced below a threshold.

16. The computer usable program product of claim 10, further comprising:

computer usable code for detecting a second state of the selected cell in the subset of cells, and wherein the second state is indicative of a remaining capacity of the selected cell having reduced below a threshold.

17. A dynamically configurable battery, comprising:

a set of cells, a subset of which is electrically connected in a configuration such that the configuration delivers a first amount of electrical power from the battery;

a second set of spare cells;

a monitoring component within the battery configured to monitor a condition; and
select, responsive to the condition, a cell from the subset; and a multiplexing component configured to
select, responsive to the condition, a spare cell from the set of spare cells;
make the selected cell in the subset electrically unavailable in the configuration;
make the selected spare cell electrically available in the configuration, resulting in eliminating an effect of the condition on a power output of the battery
identify a second condition at a time after monitoring the condition, wherein the second condition is indicative of a change in the state of the selected cell in the subset;
select, responsive to the second condition, the selected spare cell in the set of spare cells;
make the selected spare cell electrically unavailable in the configuration; and
make the selected cell in the subset electrically available in the configuration again at a second time after the time.

* * * * *